(12) United States Patent
Boyle et al.

(10) Patent No.: US 10,739,073 B2
(45) Date of Patent: Aug. 11, 2020

(54) FLUID COOLED HOUSING SYSTEM FOR INSTRUMENTS OF A METAL MAKING FURNACE

(71) Applicant: Berry Metal Company, Harmony, PA (US)

(72) Inventors: Dennis B. Boyle, Pittsburgh, PA (US); Vincent J. Civitarese, Butler, PA (US)

(73) Assignee: BERRY METAL COMPANY, Harmony, PA (US)

( * ) Notice: Subject to any disclaimer, the term of this patent is extended or adjusted under 35 U.S.C. 154(b) by 0 days.

(21) Appl. No.: 16/194,251

(22) Filed: Nov. 16, 2018

(65) Prior Publication Data

US 2019/0145708 A1 May 16, 2019

Related U.S. Application Data

(60) Provisional application No. 62/730,298, filed on Sep. 12, 2018, provisional application No. 62/719,245,
(Continued)

(51) Int. Cl.
*F27D 1/12* (2006.01)
*F27D 99/00* (2010.01)
(Continued)

(52) U.S. Cl.
CPC ............... *F27D 1/12* (2013.01); *F27B 3/205* (2013.01); *F27B 3/22* (2013.01); *F27B 3/24* (2013.01);
(Continued)

(58) Field of Classification Search
CPC .... F27B 3/205; F27B 3/22; F27B 3/24; F27D 1/0003; F27D 1/12; F27D 2009/0013;
(Continued)

(56) References Cited

U.S. PATENT DOCUMENTS

| 3,170,016 A * | 2/1965 | Grace | C21C 5/4606 |
| | | | 239/132.3 |
| 8,142,711 B2 * | 3/2012 | Glass | C21C 5/5217 |
| | | | 266/241 |

(Continued)

FOREIGN PATENT DOCUMENTS

CN 102242233 11/2011

OTHER PUBLICATIONS

Form PCT/ISA/220, PCT Notification of Transmittal of the International Search Report and the Written Opinion of the International Search Authority, or the Declaration, PCT/US2018/061691, dated Jan. 16, 2019.

*Primary Examiner* — Jessee R Roe
*Assistant Examiner* — Michael Aboagye
(74) *Attorney, Agent, or Firm* — Clark Hill PLC; Adam J. Fromm (57) ABSTRACT

A fluid cooled housing system for use in metal making furnaces. In particular, the present invention related to a novel and inventive housing and guard member configured to receive and protect an implement, such as a burner or a lance, used in connection with metal making furnaces. A preferred embodiment of the present invention comprises a housing comprising an outer shell and an inner shell that define a fluid chamber, an end cap, a bushing insert, a face plate, a fluid inlet, and a fluid outlet. Both the fluid inlet and the fluid outlet are preferably in fluid communication with both the fluid chamber defined by the shells and a fluid chamber defined by the bushing insert. In alternative preferred embodiments, the housing system further comprises a guard member that preferably envelopes and further protects the fluid cooled housing.

14 Claims, 6 Drawing Sheets

Related U.S. Application Data filed on Aug. 17, 2018, provisional application No. 62/586,894, filed on Nov. 16, 2017.

(51) Int. Cl.
*F27D 1/00* (2006.01)
*F27B 3/22* (2006.01)
*F27B 3/24* (2006.01)
*F27B 3/20* (2006.01)
*F27D 9/00* (2006.01)

(52) U.S. Cl.
CPC ....... F27D 1/0003 (2013.01); F27D 99/0073 (2013.01); *F27D 2009/0013* (2013.01); *F27D 2009/0018* (2013.01); *F27D 2009/0067* (2013.01)

(58) Field of Classification Search
CPC ..... F27D 2009/0018; F27D 2009/0067; F27D 99/0073

USPC .......... 266/190, 193, 44, 241, 168; 165/168, 165/169, 170; 29/428

See application file for complete search history.

(56) References Cited

U.S. PATENT DOCUMENTS

| 8,808,615 | B2* | 8/2014 | Lee .................. C21B 7/163 |
| | | | 266/241 |
| 8,936,749 | B2* | 1/2015 | Cady ................ C21C 5/4606 |
| | | | 266/241 |
| 2010/0252968 | A1 | 10/2010 | Glass |
| 2013/0341841 | A1 | 12/2013 | Smith |
| 2015/0218037 | A1 | 8/2015 | Charbonneau et al. |
| 2015/0308757 | A1 | 10/2015 | Garcia et al. |

\* cited by examiner

FLUID COOLED HOUSING SYSTEM FOR INSTRUMENTS OF A METAL MAKING FURNACE

CROSS REFERENCE TO RELATED APPLICATIONS

This application claims the benefit of provisional patent application U.S. Ser. No. 62/730,298 filed Sep. 12, 2018, and claims the benefit of provisional patent application U.S. Ser. No. 62/719,245 filed Aug. 17, 2018, and claims the benefit of provisional patent application U.S. Ser. No. 62/586,894 filed Nov. 16, 2017, all of which are incorporated by reference herein for all purposes.

FIELD OF THE INVENTION

The present invention relates to a fluid cooled housing system for use in metal making furnaces.

BACKGROUND OF THE INVENTION

In many metal making processes, water-cooled implements are inserted into a furnace vessel to perform desired metal processing functions. For instance, in steelmaking processes a water-cooled lance is inserted into a steelmaking vessel (e.g., a basic oxygen furnace (BOF), electric arc furnace (EAF), etc.), to promote melting, decarburization, refining and other processes useful in converting iron-containing scrap material within the vessel into steel. A typical lance may inject gaseous materials such as oxygen, hydrocarbon gas and/or inert gas at high velocity at various times to achieve desired treatment of the charged material (scrap and hot metal) and/or maintenance of the interior of the vessel. Some lances may also inject particulate carbon and/or lime (or other substances) to achieve desired properties in the steel ultimately produced.

There exists an unmet need in the art for fluid cooled housing systems designed to cool and protect implements, such as burners, an oxygen lances, and material injectors, inserted into vessels during the metal making process.

SUMMARY OF THE INVENTION

The present invention comprises a fluid, preferably water, cooled housing that may be installed in a side wall of a metal making furnace to hold and protect burners, oxygen lances, and/or material injectors, such as those employed for injection of carbon or lime into a molten metal bath of the furnace. The housing preferably has a cylindrical shape and extends farther into the furnace than traditional water cooled "box" style housings.

In an embodiment of the present invention, the housing is comprised of a mounting plate; an outer shell having an outer sleeve, an outer tube, a face plate, and an end cap; an inner shell having an inner tube and a baffle tube; and a bushing insert.

The mounting plate is preferably formed of steel, and it structurally supports the housing and is used to mount the housing to the wall of the furnace.

The outer shell comprises an outer sleeve that is preferably formed of copper, whereas the outer tube of the outer shell is preferably formed of steel. It is contemplated, however, that alternative embodiments of the present invention may comprise an outer tube formed of copper instead of steel, and thus the outer shell may be formed primarily of copper.

The outer shell and the inner shell are welded together, thereby forming a chamber that is defined by the outer shell and the inner shell. The housing has a water inlet and a water outlet which are used to circulate the cooling water through the chamber, which is partitioned by the baffle tube.

The face plate and the end cap close off opposite ends of the chamber. The face plate also provides a certain structural support to the housing for the installation of various implements at a cold side of the housing. The end cap is substantially ring shaped, and configured to receive the bushing insert.

The bushing insert is removable, preferably formed of copper, and comprises pockets configured to receive the respective ends of implements such as a burner and a lance. The bushing insert further comprises a water inlet and a water outlet that supplies a cooling system that is self-contained in the bushing insert and may comprise one or more cooling channels in the insert. The self-contained cooling system of the bushing insert helps to cool the tips of the burner and the lance. Additionally, the bushing insert is preferably free from welding or other permanent means of attachment to the housing. Instead the bushing insert is preferably received and robustly secured to the housing by virtue of the greater axial and radial thermal expansion of the copper bushing insert about the steel inner shell that surrounds the bushing insert when it is installed in the housing.

The housing of the present invention is a substantial improvement over conventional water cooled housings because the cylindrical shape of the present housing deflects slag into the molten bath of the furnace and helps to prevent adherence of slag to the housing.

The housing of the present invention is a substantial improvement over conventional water cooled housings because the outer sleeve and the end cap, which are both preferably formed of copper, have a coefficient of thermal expansion that is substantially greater than that of steel, and therefore slag that may have collected on the housing during operation of the furnace will tend to crack off as the respective temperatures of the housing and the slag change.

The housing of the present invention is a substantial improvement over conventional water cooled housings because the mechanical design, choice of materials, shape, and general absence of adhered slag render the housing a lighter weight and more accessible device for installation and service, as compared to conventional water cooled "box" style housings.

The housing of the present invention is a substantial improvement over conventional water cooled housings because the bushing insert includes a self-contained cooling system, is removable, and is readily replaceable as it lacks a means of permanent attachment to the housing that would otherwise need to be destroyed in order to remove and replace the bushing insert.

The housing of the present invention is a substantial improvement over conventional water cooled housings because the absence of welds used to secure the bushing insert to the housing mitigates the possibility that a welded joint at the hot tip of the housing could catastrophically fail under the intense stresses of thermal expansion and permit cooling water to enter the molten metal bath of the furnace and cause on explosion.

The housing of the present invention is a substantial improvement over conventional water cooled housings because the housing is covered and protected by a guard member provided in the approximate shape of a doghouse. The guard may comprise protrusions that are preferably "C" shaped with the opening of the "C" preferably facing upward. The doghouse guard is preferably securely fixed to the furnace wall to resist the impact of scrap falling onto it during furnace charging. The burner housing is positioned inside the guard for protection from impact and heat. The burner housing is removable from the furnace while leaving the guard in place.

A preferred embodiment of the present invention comprises:

A fluid cooled housing system for use in a metal making furnace, the fluid cooled housing system comprising:
  a housing comprising:
    a substantially cylindrical outer shell defining a void and having a first end, a second end, a diameter, and a lateral surface comprising a length;
    a substantially cylindrical inner shell defining a void and having a first end, a second end, a diameter and a lateral surface comprising a length;
    a fluid chamber through which a cooling fluid may flow;
    a baffle tube;
    an end cap;
    a face plate;
    a bushing insert comprising a cooling system;
    a fluid inlet and a fluid outlet;
  wherein the diameter of the outer shell is greater than the diameter of the inner shell, wherein the inner shell is nested within the void of the outer shell and connected to the outer shell such that the lateral surface of the outer shell is adjacent to the lateral surface of the inner shell along approximately the entire respective lengths of the respective lateral surfaces, and wherein the lateral surface of the outer shell and the lateral surface of the inner shell define the fluid chamber having a first end and a second end;
  wherein the baffle tube is located within the fluid chamber, the fluid chamber thereby being partitioned by the baffle tube;
  wherein the end cap is connected to the first end of the outer shell and the first end of the inner shell such that the first end of the fluid chamber is closed off by the end cap;
  wherein the face plate is connected the second end of the outer shell and second end of the inner shell via a sealing member such that the second end of the fluid chamber is closed off by the face plate;
  wherein the bushing insert is both installed in the void defined by the inner shell and connected to the end cap; and
  wherein the fluid inlet is in fluid communication with both of the fluid chamber and the self-contained cooling system of the end cap, and wherein the fluid outlet is in fluid communication with both of the fluid chamber and the cooling system of the end cap.

In an alternative preferred embodiment the fluid inlet may be bifurcated to supply cooling fluid directly to both the fluid chamber via a first portion of the bifurcated fluid inlet and to the cooling system of the via a second portion of the bifurcated fluid inlet.

In yet another alternative preferred embodiment the fluid outlet is bifurcated to receive cooling fluid directly from both the fluid chamber via a first portion of the bifurcated fluid outlet and from the cooling system of the via a second portion of the bifurcated fluid outlet.

In yet another alternative preferred embodiment, the fluid cooled housing system further comprises a guard member having sides, a first end, and a second end. The guard member may comprise a plurality of panels each having outer surfaces and forming the sides of the guard member, and a plate comprising an aperture and connected to all of the panels at the first end of the guard member. The guard member may further comprise a plurality of protrusions on outer surfaces of the panels, wherein the protrusions are configured to collect material, such as slag, on the outer surfaces of the panels.

DETAILED DESCRIPTION OF THE INVENTION

While the present invention may be susceptible to embodiment in different forms, there are described herein in detail, specific embodiments with the understanding that the present disclosure is to be considered an exemplification of the principles of the invention, and is not intended to limit the invention to that described herein.

FIGS. 1-4 show a water cooled housing 1 provided in accordance with an embodiment of the present invention, the water cooled housing 1 having a burner 10 and a lance 20 installed therein, although the housing 1 may have only one of the burner 10 or lance 20 installed therein as well. The water cooled housing 1 may be installed in a side wall of a metal making furnace (not shown) to hold and protect various implements, such as burners, oxygen lances, and/or material injectors, including those employed for injection of carbon or lime into a molten metal bath of the furnace. The housing 1 is adaptable and may be configured to house a single implement or a plurality of implements. The housing 1 preferably has a cylindrical shape and extends into the furnace beyond the inner diameter of a refractory liner of the furnace and closer to the bath than traditional water cooled "box" style housings.

In an embodiment of the present invention, as best shown in FIGS. 1-4, the housing 1 is comprised of a mounting plate 30; an outer shell 40 having an outer sleeve 50, an outer tube 60, a face plate 70, and an end cap 80; an inner shell 90 having an inner tube 100 and a baffle tube 110; and a bushing insert 120.

Figure 1:
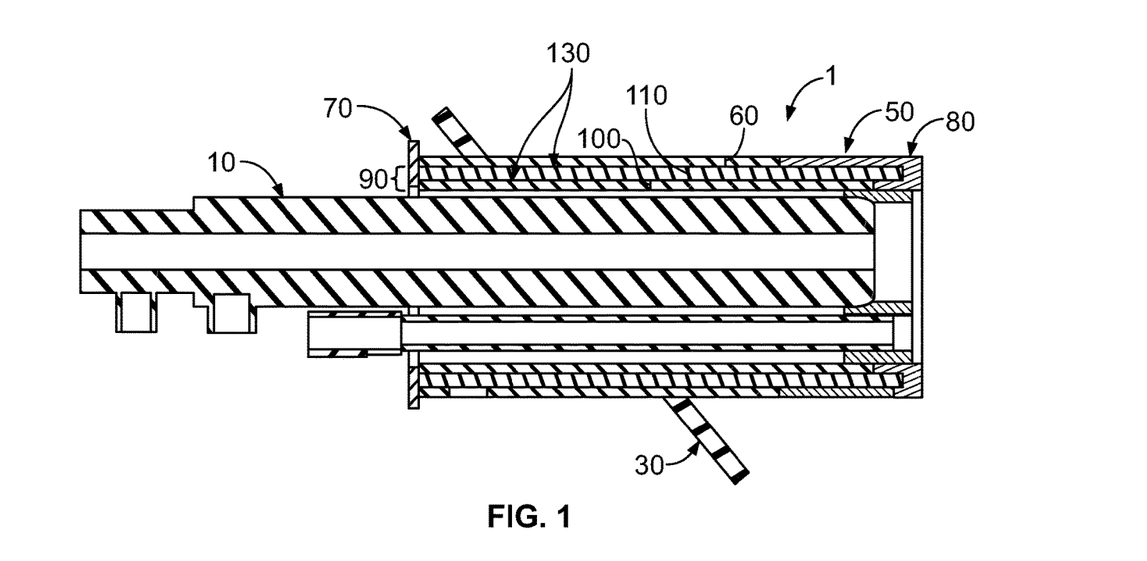
FIG. 1 is a cross-sectional view at C-C of FIG. 3 of a water cooled housing provided in accordance with an embodiment of the present invention, the water cooled housing having a burner and a lance installed therein.
Figure 2:
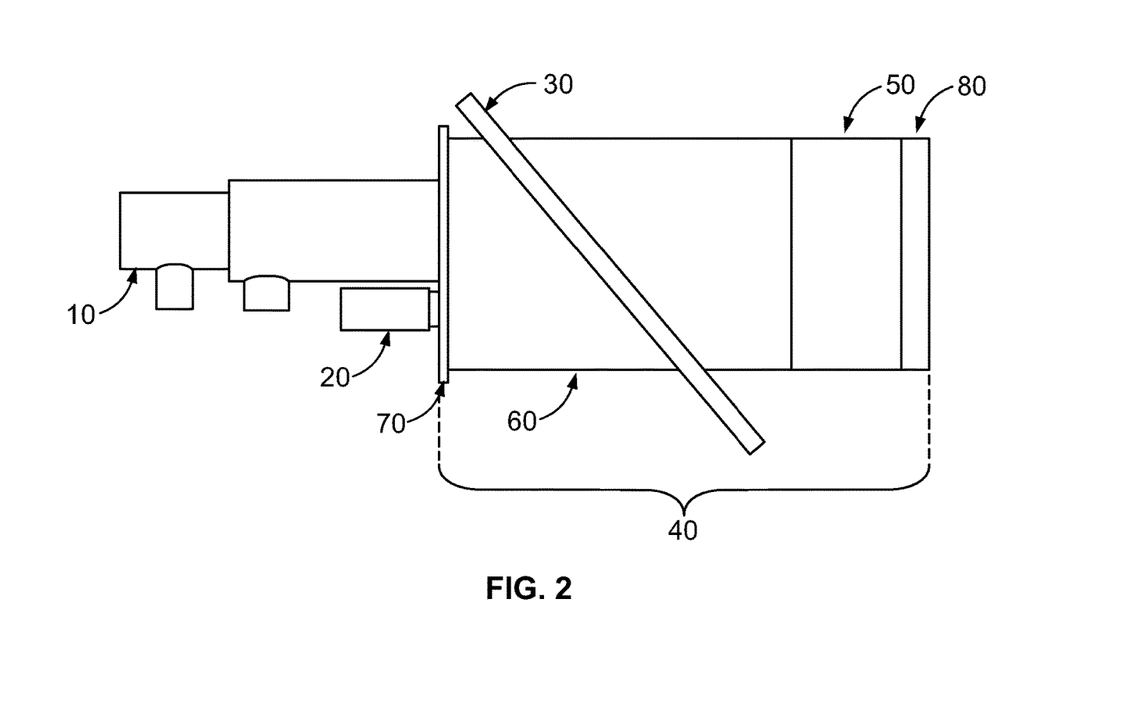
FIG. 2 is a side perspective view of a water cooled housing provided in accordance with an embodiment of the present invention, the water cooled housing having a burner and a lance installed therein.
Figure 3:
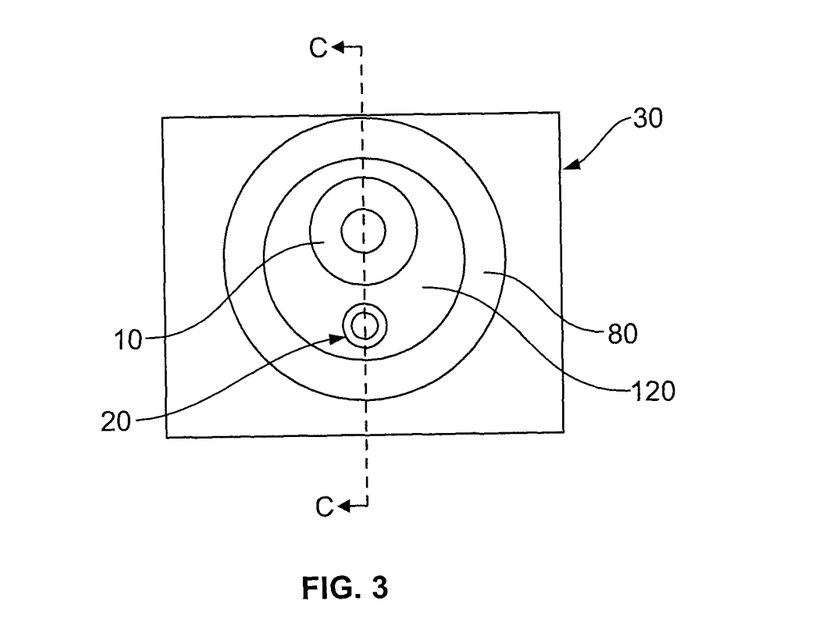
FIG. 3 is a front view of a water cooled housing provided in accordance with an embodiment of the present invention, the water cooled housing having a burner and a lance installed therein.
Figure 4:
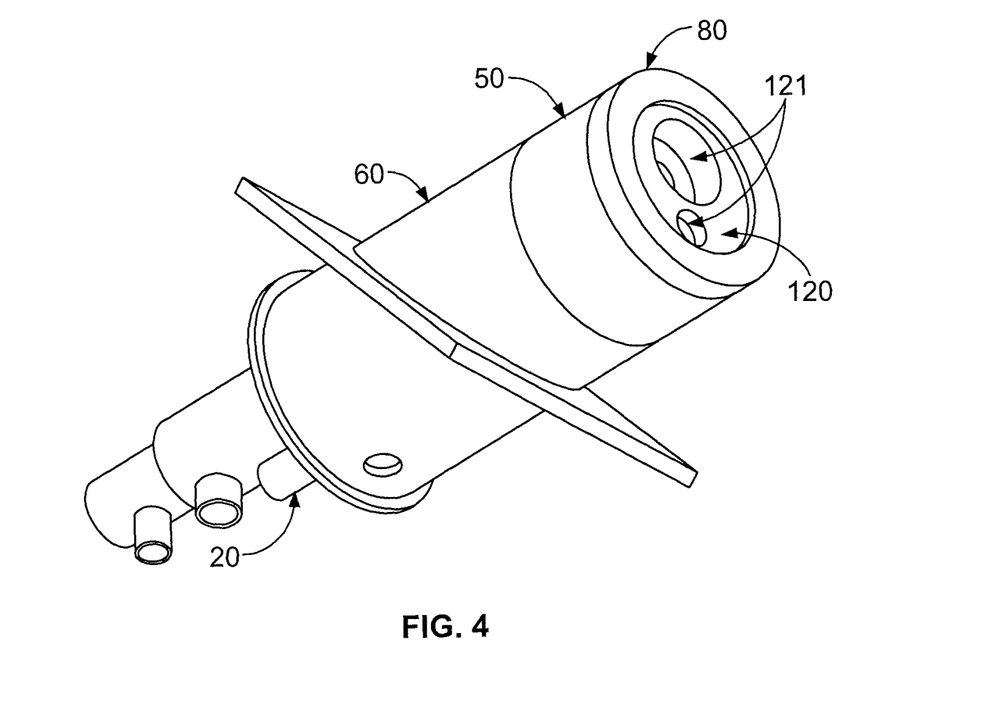
FIG. 4 is an underside perspective view of a water cooled housing provided in accordance with an embodiment into the present invention, the water cooled housing having a burner and a lance installed therein.

The mounting plate 30 is preferably formed of steel, and it structurally supports the housing 1 and is used to mount the housing 1 to the wall of the furnace. The mounting plate will separate the cold side of the housing 1 from the hot side of the housing 1, as depicted in FIG. 2.

The outer shell 40 comprises the outer sleeve 50, the outer tube 60, the face plate 70, and the end cap 80.

The outer sleeve 50 is preferably formed of copper, whereas the outer tube 60 is preferably formed of steel. It is contemplated that alternative embodiments of the present invention may comprise an outer tube 60 formed of copper instead of steel, and thus an outer shell 40 may be formed primarily of copper. The outer sleeve 50 also helps to prevent slag buildup on the housing. This is because copper has a coefficient of thermal expansion that is greater than the slag, and if slag has collected on the surface of the sleeve 50 (the slag perhaps having adopted a shape comparable to the cylindrical shape of the housing 1) during operation of the furnace, the slag will remain larger than the copper sleeve 50 when the slag and the sleeve 50 cool off and consequently tend to crack off of the housing 1. This general absence of slag buildup also makes the housing 1 more easily accessible and serviceable.

The face plate 70 is preferably formed of steel, and it provides a certain structural support to the housing 1 for the installation of various implements at a cold side of the housing 1, such as water supply tubes, burners, lances, and material injectors. The face plate 70 may be ring shaped and define an aperture.

The end cap 80 is preferably formed of copper, substantially ring shaped, and configured to receive the bushing insert 120.

The inner shell 90, including the inner tube 100 and the baffle tube 110, is preferably formed of steel. It is contemplated that alternative embodiments of the present invention may comprise an inner tube 100 and a baffle tube 110, both formed of stainless steel.

The outer shell 40 and the inner shell 90 are welded together, thereby forming a chamber 130 that is defined by the outer shell 40 and the inner shell 90. The housing 1 has a water inlet and a water outlet (not shown) which are used to circulate the cooling water through the chamber 130, which is partitioned by the baffle tube 110. Consequently, the cooling water flows down from the direction of the face plate 70 toward the end cap 80 between the inner diameter of the outer tube 60 and the outer sleeve 50 (which are adjacent and comprise the lateral surface of the outer shell 40) and the outer face of the baffle tube 110, and then returns up toward the face plate 70 between the outer diameter of the inner tube 100 and the inner face of the baffle tube 110. The face plate 70 and the end cap 80 close off opposite ends of the chamber 130.

The bushing insert 120 is removable, preferably formed of copper, and comprises pockets 121 configured to receive the respective ends of the burner 10 and the lance 20. The bushing insert 120 further comprises a water inlet and a water outlet that supplies a cooling system that is self-contained in bushing insert 120 (excluding a water supply) and therefore separate from other cooling features of the housing 1. The cooling system of the bushing insert 120 helps to cool the tips of the burner 10 and the lance 20.

Additionally, the bushing insert 120 is preferably free from welding or other permanent attachment to the housing 1. Instead, the present invention takes advantage of the greater coefficient of thermal expansion of copper than that of steel to secure the bushing insert 120 to the housing 1. That is, the bushing insert 120 is received and robustly secured to the housing 1 by virtue of the greater axial and radial thermal expansion of the copper bushing insert 120 about the steel inner shell 90 that surrounds and is married to the bushing insert 120 when the bushing insert 120 is installed in the housing 1.

The bushing insert 120 of the present invention, having both a self-contained cooling system and no permanent attachment to the housing 1, is advantageously removable and replaceable without any requirement for a weld to be cut prior to removing the bushing insert 120. Moreover, the absence of any welds used to secure the bushing insert 120 mitigates the risk that such welds might fail catastrophically under the thermal stresses of the furnace, and thereby permit a release of cooling water that could explode upon contact with the molten metal bath.

Figure 5:
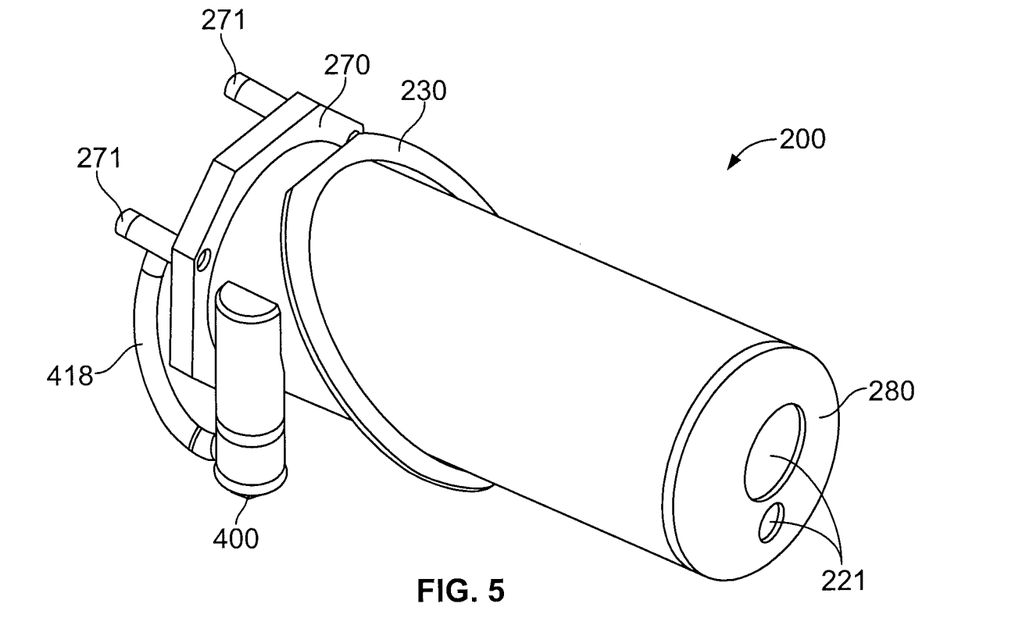
FIG. 5 is front, top side perspective view of a water cooled housing provided in accordance with a preferred embodiment of the present invention.
Figure 6:
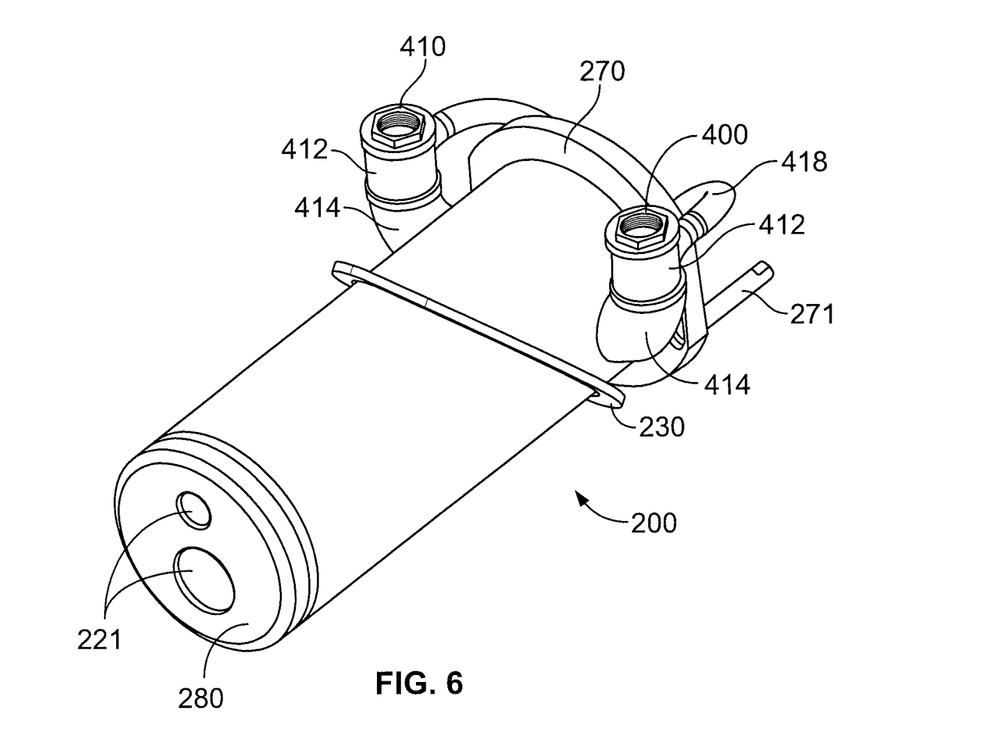
FIG. 6 is front, underside perspective view of the water cooled housing shown in FIG. 5.
Figure 7:
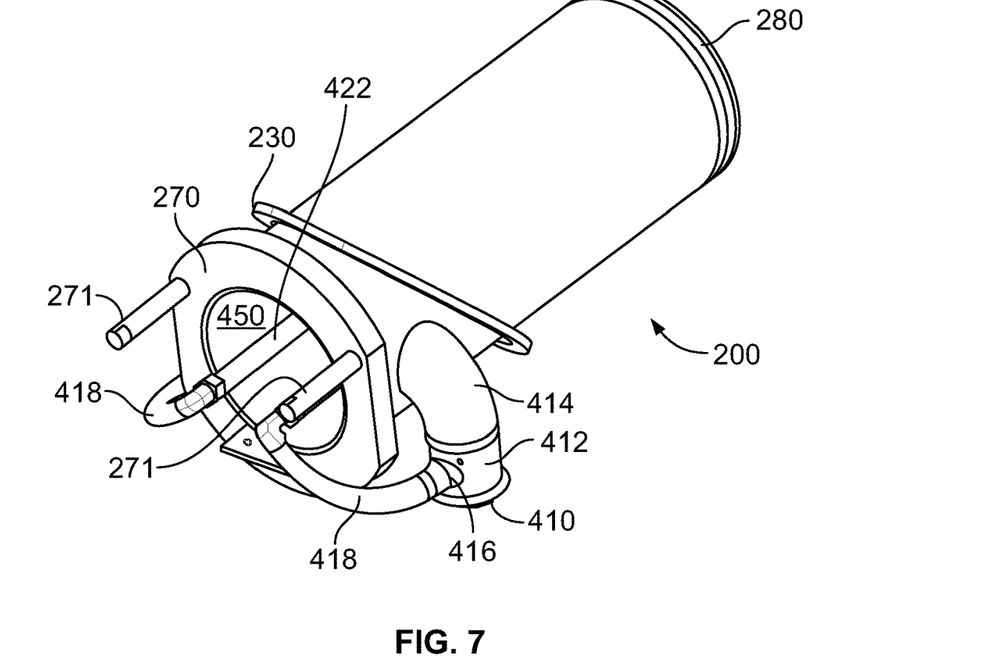
FIG. 7 is a rear, top side perspective view of the water cooled housing shown in FIGS. 5 and 6.
Figure 8:
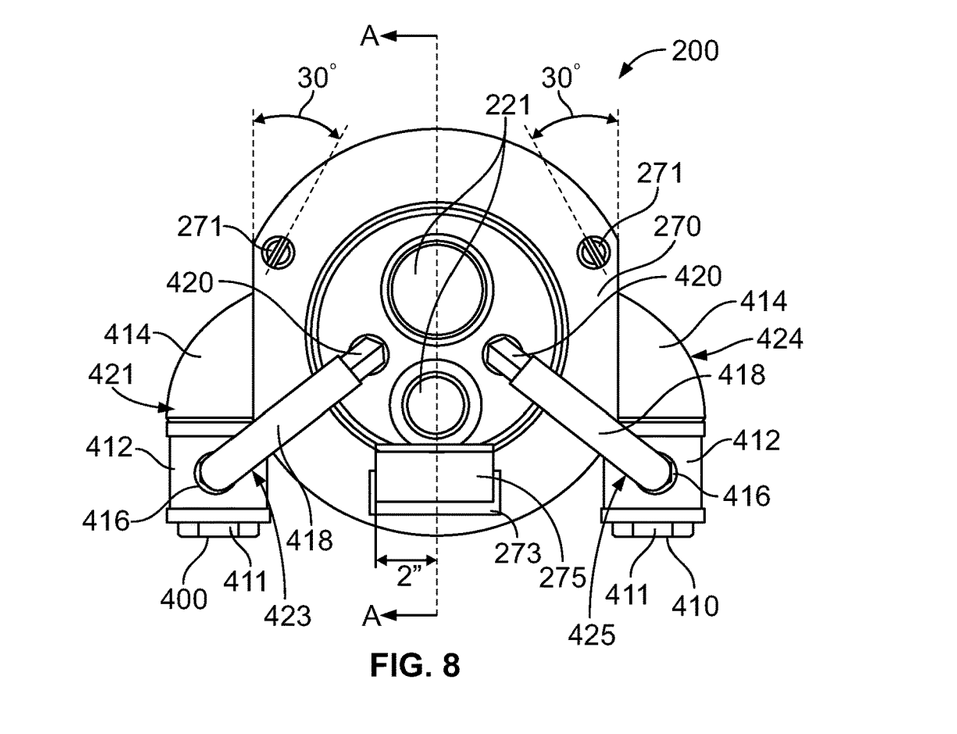
FIG. 8 is a rear view of the water cooled housing shown in FIGS. 5-7.
Figure 9:
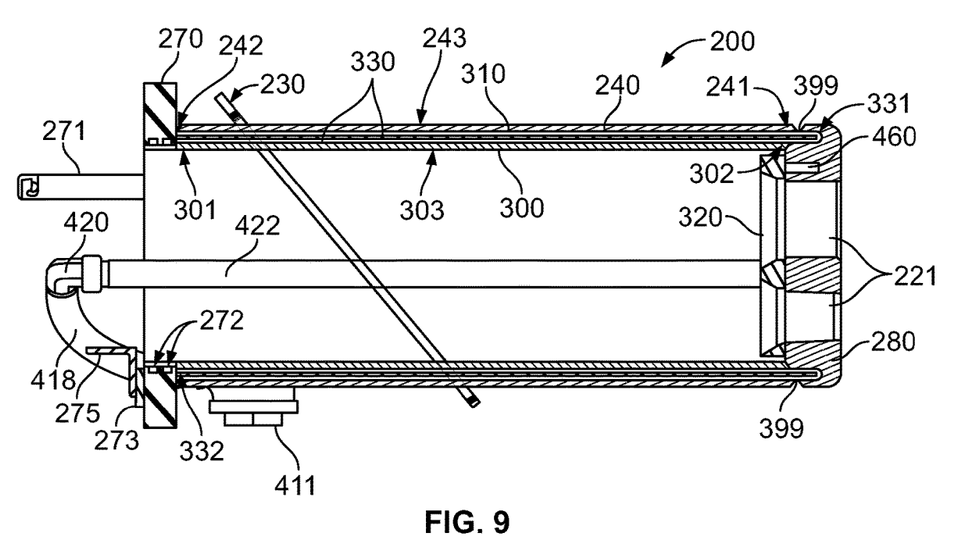
FIG. 9 is a perspective view of the water cooled housing shown in FIGS. 5-8, taken along line A-A of FIG. 8.

FIGS. 5-9 show a water cooled housing 200, which is much like the water cooled housing 1 described hereinabove, but where the water cooled housing 200 is provided in accordance with a preferred embodiment of the present invention. Specifically, FIG. 5 is front, top side perspective view of the water cooled housing 200, FIG. 6 is front, underside perspective view, FIG. 7 is a rear, top side perspective view, FIG. 8 is a rear view, and FIG. 9 is a perspective view taken along line A-A of FIG. 8.

The water cooled housing 200 shown in FIGS. 5-9 is very much like the water cooled device shown in FIGS. 1-4, described hereinabove. Much like the water cooled device 1 shown in FIGS. 1-4, the water cooled device 200 may be installed in a side wall of a metal making furnace (not shown) to hold and protect various implements, such as burners, oxygen lances, and/or material injectors, including those employed for injection of carbon or lime into a molten metal bath of the furnace. Additionally, the housing 200 is preferably adaptable and may be configured to house a single implement or a plurality of implements. The housing 200 preferably has a cylindrical shape and extends into the furnace beyond the inner diameter of a refractory liner of the furnace and closer to the bath than traditional water cooled "box" style housings. Preferably, the housing 200 extends into the furnace beyond the inner diameter of the refractory liner, and the innermost cavity 450 of the housing 200 is open to the atmosphere outside the furnace.

Preferably, the housing 200 is comprised of a mounting ring or mounting plate 230. Much like the mounting plate 30 associated with housing 1, the mounting plate or mounting ring 230 is preferably formed of steel, and it structurally supports the housing 200 and is used to mount the housing 200 to the wall of the furnace. The mounting plate 230 effectively separates the cold side of the housing 200 from the hot side of the housing 1 (such as is depicted in FIG. 2).

The housing 200 also preferably includes a face plate preferably in the form of a shoulder ring 270. As shown best in FIG. 9, the shoulder ring 270 may include two extending quarter turn spring lock pins 271, for mounting of the burner 10, as well as have a bar flat 273 connected thereto which is connected to a pipe support 275.

As best shown in FIG. 9, the housing 200 also preferably includes an outer shell or sleeve 240 having a first end 241 and a second end 242, an inner shell or sleeve 300 having a first end 302 and a second end 301, and a baffle tube or water baffle 310 disposed between the outer shell 240 and the inner shell 300. Preferably, the water baffle 310 extends the furthest from the furnace.

As shown in FIG. 9, at least one sealing member 272, such as o-rings, may be provided between the shoulder ring 270 and the inner shell 300. Preferably, an end cap or housing tip 280 is provided at the end of the housing 200, and preferably a bushing insert or sealing plate 320 is engaged with the end cap 280 in the housing 200. Preferably, the housing tip 280 and sealing plate 320 collectively provide pockets 221 configured to receive the respective ends of a burner or other implement (i.e., water supply tubes, lances, material injectors, etc.).

Both the water baffle 310 and the inner shell 300 are preferably formed of stainless steel, while the outer shell 240, housing tip 280 and sealing plate 320 are all preferably formed of copper, although other materials could be used while still staying within the scope of the present invention.

Much like the face plate 70 associated with the water cooled housing 1 described previously, the face plate or shoulder ring 270 is preferably formed of steel and provides a certain structural support to the housing 200 for the installation of various implements at a cold side of the housing 200, such as water supply tubes, burners, lances, and material injectors.

The outer shell 240 and inner shell 300 are preferably welded together (such as at points 399 shown in FIG. 9) to define a chamber 330 there between, the chamber 300 having a first end 331 and a second end 332. The housing 200 has a water inlet 400 and a water outlet 410 which are used to circulate the cooling water through the chamber 330, which is partitioned by the baffle tube or water baffle 310. Consequently, the cooling water flows down from the direction of the face plate 270 toward the end cap 280, between the inner diameter of the outer shell 240 and the outer face of the water baffle 310, and then returns up toward the face plate 270 between the outer diameter of the inner shell 300 and the inner face of the water baffle 310. The face plate 270 and the end cap 280 close off opposite ends of the chamber 330.

Figure 10:
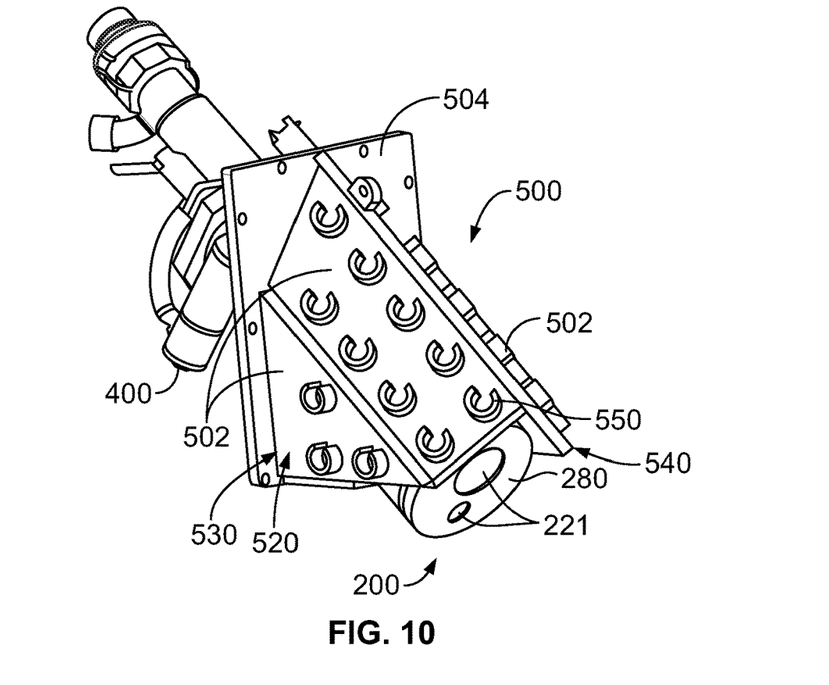
FIG. 10 shows the water cooled housing with a device, such as a burner, installed therein, and showing a guard member covering and protecting the water cooled housing.

The bushing insert or sealing plate 320 is preferably can be removable from or attached to the end cap 280. Preferably, both components have at least one opening 221 provided therein to receive various implements, such as burners, oxygen lances, and/or material injectors, including those employed for injection of carbon or lime into a molten metal bath of the furnace. For example, FIG. 10 shows the housing 200 receiving a burner. FIG. 10 also shows the housing 200 being covered and protected by a guard member 500, which will be described in more detail later herein.

Preferably, the bushing insert or sealing plate 320 further comprises a water inlet 400 and a water outlet 410 that supplies a cooling system that is self-contained and therefore separate from other cooling features of the housing 200. The cooling system of the bushing insert or sealing 320 helps to cool the tip of the burner, or really any other device which extends through the housing 200. The cooling system may comprise cooling channels where fluid may flow.

In some alternative embodiments, the bushing insert or sealing plate may be free from welding or other permanent attachment to the housing. Instead, the present invention takes advantage of the greater coefficient of thermal expansion of copper than that of stainless steel to secure the bushing insert to the housing. That is, the bushing insert can be received and robustly secured to the housing by virtue of the greater axial and radial thermal expansion of the copper bushing insert about the stainless steel inner sleeve that surrounds and is married to the bushing insert when the bushing insert is installed in the housing.

The bushing insert of such alternative embodiments, having both a self-contained cooling system and no permanent attachment to the housing, can be removable and replaceable without any requirement for a weld to be cut prior to removing the bushing insert. Moreover, the absence of any welds used to secure the bushing insert mitigates the risk that such welds might fail catastrophically under the thermal stresses of the furnace, and thereby permit a release of cooling water that could explode upon contact with the molten metal bath.

The sealing plate 320 and end cap 280 have a self-contained cooling system to provide more efficient cooling to the various implements housed within.

The water inlet 400 and water outlet 410 will now be described in more detail. Preferably, the water inlet 400 and outlet 410 collectively function to provide water both to and from the chamber 330 in the housing 200, as well as both to and from the housing tip 280. This can be achieved using many different structures, but a specific, preferred structure will now be described.

Preferably, both the water inlet 400 and water outlet 410 comprise structure for connecting to a hose. As shown in FIG. 8, such structure could be, for example, an adapter bushing 411. The adapter bushing 411 is preferably connected to an adapter 412. The adapter 412 is preferably connected to a water elbow 414 that is preferably welded to an opening provided on the outer shell 240. This structure effectively functions to provide a fluid path both to and from the chamber 330 (see FIG. 9) inside the housing 200, preferably 360 degrees around the interior of the housing 200.

Preferably, as shown in FIG. 8, the adapter 412 provides a hose barb 416 that is connected to a hose 418 that engages a hose barb elbow 420 (see FIG. 9) that engages a pipe 422 that extends through an interior of the housing 200 and connects to the housing tip 280, such that water is provided to and from the housing tip 280, and circulates through chamber 460, the chamber 460 preferably extending on an arcuate path through the body of the tip 280.

As such, the water inlet 400 and outlet 410 collectively function to provide water both to and from the chamber 330 in the housing 200, as well as both to and from the housing tip 280, thereby providing beneficial cooling of the housing 200 and, in turn, any implements extending therethrough. The fact that a second water cooled area is provided in the tip 280 aides, through conduction, in the cooling of any implement which extends through the housing 200.

Figure 11:
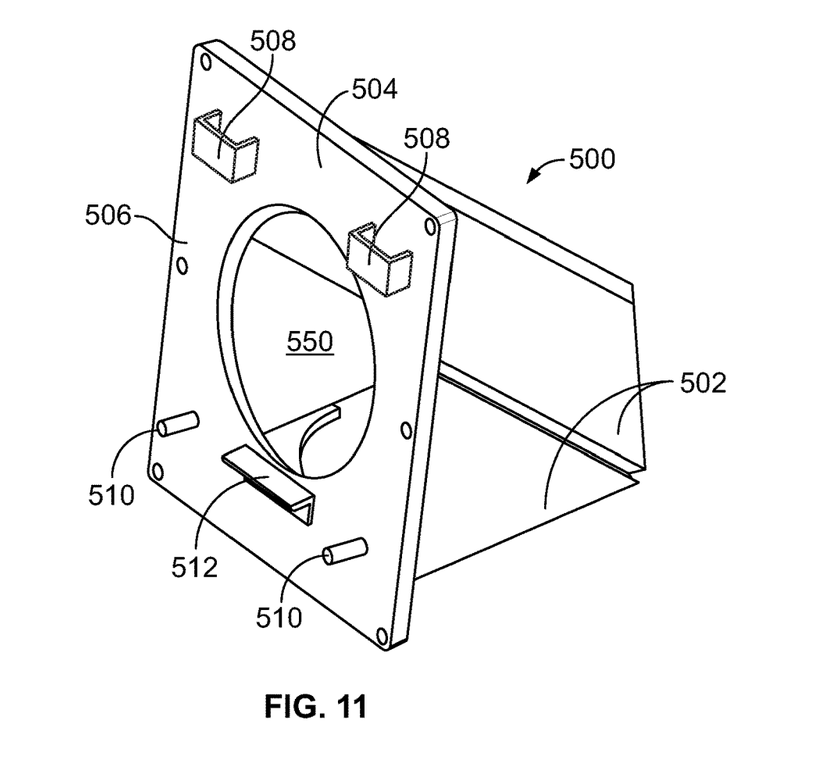
FIG. 11 is a rear perspective view of the guard member shown in FIG. 10.

As discussed hereinabove, preferably the housing 200 is covered and protected by a guard member 500 such as is shown in FIG. 10. Preferably, the guard member 500 is shaped and configured to protect the housing 200 from direct impacts during furnace charging. In a preferred embodiment the guard 500 is provided such that two panels 502 converge at an approximate 90 degree or obtuse angle at the upward facing portion of the housing 200, as shown in FIG. 10. The panels 502 comprises surfaces 520. The guard 500 comprises first end 530 and second end 540. Additional side panels 502 meet the two upper panels 502 to complete the portion of the guard 500 that covers and protects the hot side portion of the housing 200. In this configuration, the guard 500 is provided in the approximate shape of a "doghouse." It is contemplated that the guard 500 may be comprises a plurality of panels or a unitary structure formed in the aforementioned shape to protect the housing 200. This allows the guard 500 and the housing 200 to be designed for their own specialized functions, and allows them to be independently replaced if need be. The guard 500 may comprise protrusions 550, which can help collect material on the surface of the guard 500 to provide an additional layer of thermal and mechanical protection for the housing 200. The protrusions may be "C" shaped as shown in FIG. 10, with the opening of the "C" facing upward. Alternative shapes and configurations for the protrusions 550 are contemplated. As shown in FIG. 10, the guard member 500 preferably has the extending panels 502 which function to shield the housing 200, and those panels 502 are preferably connected to a plate 504. As shown in FIG. 11, preferably, the back 506 of the plate 504 has structure which functions to facilitate connection of the guard to the furnace (not shown). For example, c-shaped channels 508, threaded posts 510, and an angle attachment 512 could be provided on the back 506 of the plate 504. Plate 504 preferably defines aperture 550. Castable refractory material may be installed in the guard 500 to occupy a gap between it and the housing 200. This refractory material aids in heat transfer between the guard 500 and the housing 200.

While specific embodiments of the invention have been shown and described, it is envisioned that those skilled in the art may devise various modifications without departing from the spirit and scope of the present invention.

The invention claimed is:

1. A fluid cooled housing system for use in a metal making furnace, the fluid cooled housing system comprising:
   a housing comprising:
      a substantially cylindrical outer shell defining a void and having a first end, a second end, a diameter, and a longitudinal surface comprising a length that extends from the first end to the second end;
      a substantially cylindrical inner shell defining a void and having a first end, a second end, a diameter and a longitudinal surface comprising a length that extends from the first end to the second end;
      a fluid chamber through which a cooling fluid may flow;
      a baffle tube;
      an end cap comprising a cooling system;
      a face plate;
      a bushing insert comprising a cooling system;
      a fluid inlet and a fluid outlet;
   wherein the diameter of the outer shell is greater than the diameter of the inner shell, wherein the inner shell is nested within the void of the outer shell and connected to the outer shell such that the longitudinal surface of the outer shell is adjacent and substantially parallel to the longitudinal surface of the inner shell along approximately the entire respective lengths of the respective longitudinal surfaces, and wherein the longitudinal surface of the outer shell and the longitudinal surface of the inner shell define the fluid chamber having a first end and a second end;
   wherein the baffle tube is located within the fluid chamber, the fluid chamber thereby being partitioned by the baffle tube;
   wherein the end cap is connected to the first end of the outer shell and the first end of the inner shell such that the first end of the fluid chamber is closed off by the end cap;
   wherein the face plate is connected to the second end of the outer shell and second end of the inner shell via a sealing member such that the second end of the fluid chamber is closed off by the face plate;
   wherein the bushing insert is both installed in the void defined by the inner shell and attached to the end cap; and
   wherein the fluid inlet is in fluid communication with both of the fluid chamber and the cooling system of the end cap, and wherein the fluid outlet is in fluid communication with both of the fluid chamber and the cooling system of the end cap.

2. The fluid cooled housing system of claim 1, further comprising a mounting plate.

3. The fluid cooled housing system of claim 1, wherein the face plate is substantially ring shaped.

4. The fluid cooled housing system of claim 1, wherein the bushing insert and the end cap define at least one aperture configured to receive an implement.

5. The fluid cooled housing system of claim 4, wherein the implement is selected from the group consisting of a burner, an oxygen lance, and a material injector.

6. The fluid cooled housing system of claim 1, wherein the cooling fluid is water.

7. The fluid cooled housing system of claim 1, wherein the fluid inlet is bifurcated to supply cooling fluid directly to both the fluid chamber via a first portion of the bifurcated fluid inlet and to the cooling system of the bushing insert via a second portion of the bifurcated fluid inlet.

8. The fluid cooled housing system of claim 1, wherein the fluid outlet is bifurcated to receive cooling fluid directly from both the fluid chamber via a first portion of the bifurcated fluid outlet and from the cooling system of the bushing insert via a second portion of the bifurcated fluid outlet.

9. The fluid cooled housing system of claim 1, further comprising a guard member having sides, a first end, and a second end.

10. The fluid cooled housing system of claim 9, the guard member comprising a plurality of panels each having outer surfaces and forming the sides of the guard member, and a plate comprising an aperture and connected to all of the panels at the first end of the guard member.

11. The fluid cooled housing system of claim 10, further comprising a plurality of protrusions on outer surfaces of the panels, wherein the protrusions are configured to collect material, such as slag, on the outer surfaces of the panels.

12. The fluid cooled housing system of claim 11, wherein the protrusions are approximately "C" shaped.

13. The fluid cooled housing system of claim 11, wherein the guard member is configured to receive the housing through the aperture of the plate such that the guard envelopes at least a portion of the housing.

14. The fluid cooled housing system of claim 13, wherein a castable refractory material is used to occupy a gap between the guard and the housing.

* * * * *